(12) United States Patent
Uno

(10) Patent No.: US 7,570,026 B2
(45) Date of Patent: Aug. 4, 2009

(54) PROTECTION CIRCUIT WITH MINIMIZED VOLTAGE REFERENCE UNEVENNESS BETWEEN CHARGER AND BATTERY PACK

(75) Inventor: Juichi Uno, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 246 days.

(21) Appl. No.: 11/762,693

(22) Filed: Jun. 13, 2007

(65) Prior Publication Data

US 2008/0310064 A1    Dec. 18, 2008

(51) Int. Cl.
| | |
|---|---|
| H02J 7/04 | (2006.01) |
| H02J 7/16 | (2006.01) |
| H02H 3/00 | (2006.01) |
| H02J 7/06 | (2006.01) |
| H02J 7/24 | (2006.01) |

(52) U.S. Cl. .......................... 320/162; 361/86; 320/163
(58) Field of Classification Search ................. 320/107, 320/128, 132–136, 148, 149, 151, 152, 156–159, 320/161–164; 307/10.7; 361/86
See application file for complete search history.

(56) References Cited

U.S. PATENT DOCUMENTS 5,631,537 A * 5/1997 Armstrong .................. 320/118
6,340,880 B1 * 1/2002 Higashijima et al. ........ 320/162

FOREIGN PATENT DOCUMENTS

| | | |
|---|---|---|
| JP | 2001-112182 | 4/2001 |
| JP | 2002-315215 | 10/2002 |

\* cited by examiner

*Primary Examiner*—Akm E Ullah
*Assistant Examiner*—Ahmed Omar
(74) *Attorney, Agent, or Firm*—SoCal IP Law Group LLP; Steven C. Sereboff; John E. Gunther

(57) ABSTRACT

A protection circuit comprising: a second circuit to be connected to a first circuit, the first circuit including: a first reference voltage generating circuit configured to generate a first reference voltage; a first comparing voltage generating circuit configured to generate a first comparing voltage; a first comparator configured to output a first comparing output voltage; and a first control circuit, the second circuit including: a second comparing voltage generating circuit configured to be input with the first reference voltage and to generate a second comparing voltage to be compared with a battery voltage based on the first reference voltage; a second comparator configured to output a second comparing output voltage corresponding to relation in magnitude between the second comparing voltage and the battery voltage; and a second control circuit configured to control the supply of the charging voltage to the secondary battery corresponding to the second comparing output voltage.

6 Claims, 5 Drawing Sheets ated circuits 134 and 234 and the comparing voltage generating circuits 133 and 233, there is a limit for bringing the comparing voltages $V_{HC}$ and $V_{HB}$ close to the charging limit voltage $V_L$ with the configuration of the above protection circuit. This will be described with reference to FIG. 5. For example, it is assumed that when the charging limit voltage $V_L$ is 4.5 V, each of the unevenness between the reference voltage generating circuits 134 and 234 and the unevenness between the comparing voltage generating circuits 133 and 233 is in the range of ±50 mV. In this case, the comparing voltage $V_{HC}$ has variation in the range of ±100 mV. Considering the relation between the comparing voltages $V_{HC}$ and $V_{HB}$ that is $V_{HC}<V_{HB}$, it is also assumed that a safe range of 50 mV is secured between the upper limit of the variation of the comparing voltage $V_{HC}$ and the lower limit of the variation of the comparing voltages $V_{HD}$ and another safe range of 50 mV is also secured between the comparing voltage $V_{HB}$ and the charging limit voltage $V_L$. In this case, as shown in FIG. 5, the comparing voltage $V_{HB}$ of the battery pack 2 is 4.35 V and the comparing voltage $V_{HC}$ of the charger 1 is 4.1 V. Therefore, the comparing voltage $V_{HC}$ must be set at a value lower than the charging limit voltage $V_L$ by as much as 0.4 V.

---

PROTECTION CIRCUIT WITH MINIMIZED VOLTAGE REFERENCE UNEVENNESS BETWEEN CHARGER AND BATTERY PACK

BACKGROUND OF THE INVENTION

1. Field of the Invention

The present invention relates to a protection circuit used in a battery charger, a battery pack, etc., for secondary batteries, and more specifically to a technique to make possible to charge a secondary battery at a high voltage securing safety.

2. Description of the Related Art

A protection circuit for preventing overcharging and executing the charging management is provided in a battery charger and a battery pack of lithium ion secondary batteries. FIG. 4 depicts an example of a charging system including a charger 1 for a lithium ion secondary battery and a battery pack 2 that incorporates the lithium ion secondary battery. In FIG. 4, the charger 1 is provided with two P-type MOSFETs 121 and 122 that control the supply of a DC voltage of a voltage supplying circuit 11 and a protection circuit IC 13 that controls turning on and off of the MOSFETs 121 and 122 corresponding to the inter-terminal voltage of the battery pack 2.

The protection circuit IC 13 includes four terminals that are a positive input terminal 1311, a negative input terminal 1312, and two gate voltage output terminals 1313 and 1314 connected to a control circuit 131, and the IC 13 further includes the control circuit 131, a comparator 132, a comparing voltage generating circuit 133, and a reference voltage generating circuit 134.

The comparing voltage generating circuit 133 generates a comparing voltage $V_{HC}$ based on a reference voltage $V_{OC}$ supplied from the reference voltage generating circuit 134. A non-inverting input of the comparator 132 is applied with the comparing voltage $V_{HC}$ output from the comparing voltage generating circuit 133 and an inverting input of the comparator 132 is applied with a battery voltage $V_{BATT}$ of the lithium ion secondary battery 21. Actually, the inverting input of the comparator 132 is not input with the battery voltage $V_{BATT}$ having its full value, but input with a voltage having a value obtained by subtracting: a value of voltage drop caused by passing through the MOSFETs 121 and 122, etc.; from a value of the battery voltage $V_{BATT}$.

An output voltage of the comparator 132 is input to the control circuit 131. The control circuit 131 controls an output voltage to the gate voltage output terminals 1313 and 1314 corresponding to the input voltage. For example, when the battery voltage $V_{BATT}$ and the comparing voltage $V_{HC}$ are in $V_{BATT}>V_{HC}$, the control circuit 131 turns off the MOSFET 121 and turns on the MOSFET 122, thereby stopping supply of the charging voltage to the lithium ion secondary battery 21. Even in this case, the lithium ion secondary battery 21 can discharge through a parasitic diode 1211 of the MOSFET 121.

In FIG. 4, the battery pack 2 is provided with two N-type MOSFETs 221 and 222 that control the supply of the charging voltage of the lithium ion secondary battery 21, and a protection circuit IC 23 that controls turning on and off of the MOSFETs 221 and 222 corresponding to the battery voltage of the lithium ion secondary battery 21. The protection circuit IC 23 includes four terminals of a positive input terminal 2311, a negative input terminal 2312, and two gate voltage output terminals 2313 and 2314 connected to a control circuit 231, and the IC 23 further includes the control circuit 231, a comparator 232, a comparing voltage generating circuit 233, and a reference voltage generating circuit 234.

The comparing voltage generating circuit 233 generates a comparing voltage $V_{HB}$ based on a reference voltage $V_{OB}$ supplied from the reference voltage generating circuit 234. A non-inverting input of the comparator 232 is input with a comparing voltage $V_{HB}$ and an inverting input thereof is input with the battery voltage $V_{BATT}$ of the lithium ion secondary battery 21. Actually, the inverting input of the comparator 232 is not input with the battery voltage $V_{BATT}$ having its full value, but input with a voltage having a value obtained by subtracting: a value of voltage drop caused by passing through the MOSFETs 221 and 222, etc.

An output voltage of the comparator 232 is input to the control circuit 231. The control circuit 231 controls an output voltage of the gate voltage output terminals 2313 and 2314 corresponding to the input voltage. For example, when the battery voltage $V_{BATT}$ and the comparing voltage $V_{HB}$ are in $V_{BATT}>V_{HB}$, the control circuit 231 turns off the MOSFET 221 and turns on the MOSFET 222, thereby stopping supply of the charging voltage to the lithium ion secondary battery 21. Even in this case, the lithium ion secondary battery 21 can discharge through parasitic diode 2211 of the MOSFET 221.

In the charging system configured as above, when the protection circuit IC 23 of the battery pack 2 has detected overcharging before the protection circuit IC 13 of the charger 1 detects the overcharging, a state may occur, where the charging voltage is supplied from the charger 1 to the lithium ion secondary battery 21 even when a current path in the charging direction is blocked in the battery pack 2. Therefore, it is common to set a relation between the comparing voltages $V_{HC}$ and $V_{HB}$ as $V_{HC}<V_{HB}$ in order that the protection circuit IC 13 of the charger 1 operates before the protection circuit IC 23 of the battery pack does (see Japanese Patent Application Laid-Open Publication Nos. 2002-315215 and 2001-112182).

It is well known that the amount of charge (the energy density) held in the lithium ion secondary battery 21 can be increased with increasing a voltage at which the battery is charged. Therefore, the amount of charge of the lithium ion secondary battery 21 can be increased by setting the comparing voltages $V_{HC}$ and $V_{HB}$ to be as close as possible to the limit voltage, above which the battery is overcharged (hereinafter referred to as "charging limit voltage $V_L$").

However, considering the manufacture unevenness, temperature characteristics, etc., of the reference voltage gener-

SUMMARY OF THE INVENTION

A protection circuit according to an aspect of the present invention, comprises: a second circuit to be connected to a first circuit, the first circuit including: a first reference voltage generating circuit configured to generate a first reference voltage; a first comparing voltage generating circuit configured to generate a first comparing voltage to be compared with a battery voltage of a secondary battery to be charged based on the first reference voltage; a first comparator configured to output a first comparing output voltage corresponding to relation in magnitude between the first comparing voltage and the battery voltage; and a first control circuit configured to control supply of a charging voltage to the secondary battery corresponding to the first comparing output voltage, the second circuit including: a second comparing voltage generating circuit configured to be input with the first reference voltage and to generate a second comparing voltage to be compared with the battery voltage based on the first reference voltage; a second comparator configured to output a second comparing output voltage corresponding to relation in magnitude between the second comparing voltage and the battery voltage; and a second control circuit configured to control the supply of the charging voltage to the secondary battery corresponding to the second comparing output voltage.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
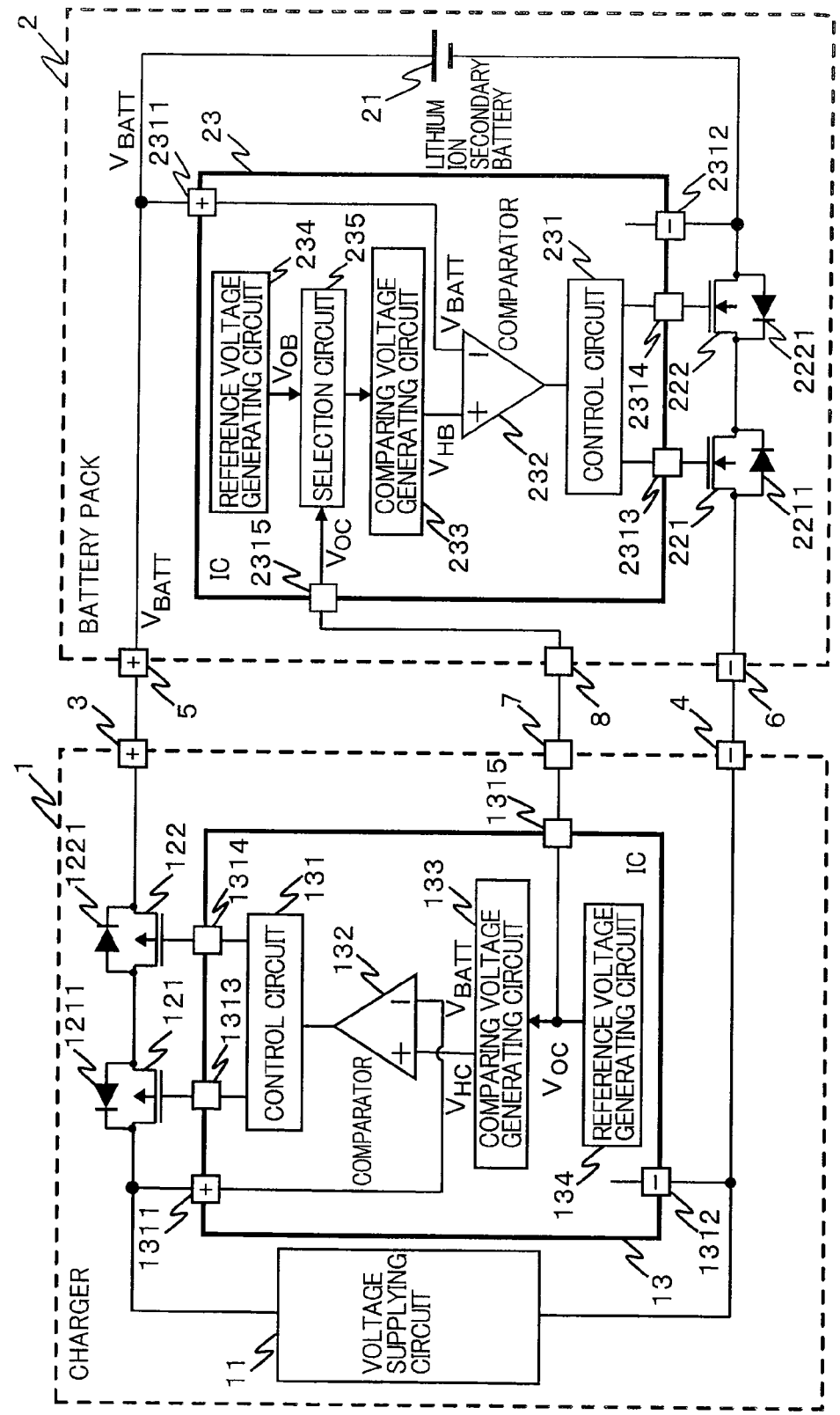
FIG. 1 is a diagram showing a configuration of a charging system of a lithium ion secondary battery 21 according to an embodiment of the present invention.

FIG. 1 is a diagram showing a configuration of a charging system comprising a charger 1 for a lithium ion secondary battery and a battery pack 2 including the lithium ion secondary battery 21, according to an embodiment of the present invention.

The charger 1 is provided with: a positive connecting terminal 3 that is connected to a positive terminal 5 of the battery back 2; and a negative connecting terminal 4 that is connected to a negative terminal 6 of the battery pack 2, both at the time when the battery 21 is charged. The charger 1 is provided with a voltage output terminal 7 that is connected to a voltage input terminal 8 provided for the battery pack 2 when the battery 21 is charged. The battery pack 2 is provided with the voltage input terminal 8 that is connected to the voltage output terminal 7 provided for the charger 1 when the battery 21 is charged. A reference voltage $V_{OC}$ (a first reference voltage) described later is output to the voltage output terminal 7, and the reference voltage $V_{OC}$ is taken into the battery pack 2 through the voltage input terminal 8.

The charger 1 includes two P-type MOSFETs 121 and 122 connected in series to a supply path of a charging voltage and a protection circuit IC 13 that detects the battery voltage of the lithium ion secondary battery 21 and controls turning on and off of the MOSFETs 121 and 122 corresponding to the detected battery voltage. The protection circuit IC 13 includes a reference voltage generating circuit 134 (a first reference voltage generating circuit), a comparing voltage generating circuit 133 (a first comparing voltage generating circuit), a comparator 132 (a first comparator), and a control circuit 131 (a first control circuit), and the IC 13 further includes a positive input terminal 1311, a negative input terminal 1312, two gate voltage output terminals 1313 and 1314 connected to a control circuit 131, and a reference voltage output terminal 1315 to which a reference voltage $V_{OC}$ generated by the reference voltage generating circuit 134 is output.

Among the circuits included in the protection circuit IC 13, the comparing voltage generating circuit 133 (the first comparing voltage generating circuit) generates a comparing voltage $V_{HC}$ (a first comparing voltage) based on the reference voltage $V_{OC}$ supplied from the reference voltage generating circuit 134. A non-inverting input of the comparator 132 is input with a comparing voltage $V_{HC}$ output from the comparing voltage generating circuit 133, and an inverting input thereof is input with a battery voltage $V_{BATT}$ of the lithium ion secondary battery 21 input from the positive input terminal 1311. The comparator 132 outputs a comparing output voltage (a first comparing output voltage) corresponding to the relation in magnitude between the input comparing voltage $V_{HC}$ and the battery voltage $V_{BATT}$, and the comparing output voltage is input to the control circuit 131.

The control circuit 131 controls output voltages of the gate voltage output terminals 1313 and 1314 corresponding to the comparing output voltage input from the comparator 132 and thereby turning on or off the MOSFETs 121 and 122. For example, when the battery voltage $V_{BATT}$ and the comparing voltage $V_{HC}$ are in $V_{BATT} > V_{HC}$, the control circuit 131 turns off the MOSFET 121 and turns on the MOSFET 122. In this case, supply of the charging voltage to the lithium ion secondary battery 21 is stopped.

On the other hand, in FIG. 1, the battery pack 2 includes two N-type MOFETs 221 and 222 that are connected in series to the supply path of the charging voltage, and a protection circuit IC 23 that detects the battery voltage of the lithium ion secondary battery 21 and controls turning on and off of the MOSFETs 221 and 222 corresponding to the detected battery voltage.

The protection circuit IC 23 includes a reference voltage generating circuit 234 (a second reference voltage generating circuit), a comparing voltage generating circuit 233 (a second comparing voltage generating circuit), a comparator 232 (a second comparator), a control circuit 231 (a second control circuit), and a selection circuit 235, and the IC 23 further includes a positive input terminal 2311, a negative input terminal 2312, two gate voltage output terminals 2313 and 2314 connected to the control circuit 231, and a reference voltage input terminal 2315 that is connected to the reference voltage input terminal 8 and is input with the reference voltage $V_{OC}$ generated by the reference voltage generating circuit 134 of the charger 1.

When the charger 1 is connected to the battery pack 2 and the reference voltage $V_{OC}$ is input to the reference voltage input terminal 2315, the selection circuit 235 among the circuits included in the protection circuit IC 23 outputs the reference voltage $V_{OC}$ to the comparing voltage generating circuit 233. When the charger 1 is not connected to the battery pack 2, the selection circuit 235 outputs to the comparing voltage generating circuit 233 the reference voltage $V_{OB}$ (second reference voltage) supplied from the reference voltage generating circuit 234.

Figure 2:
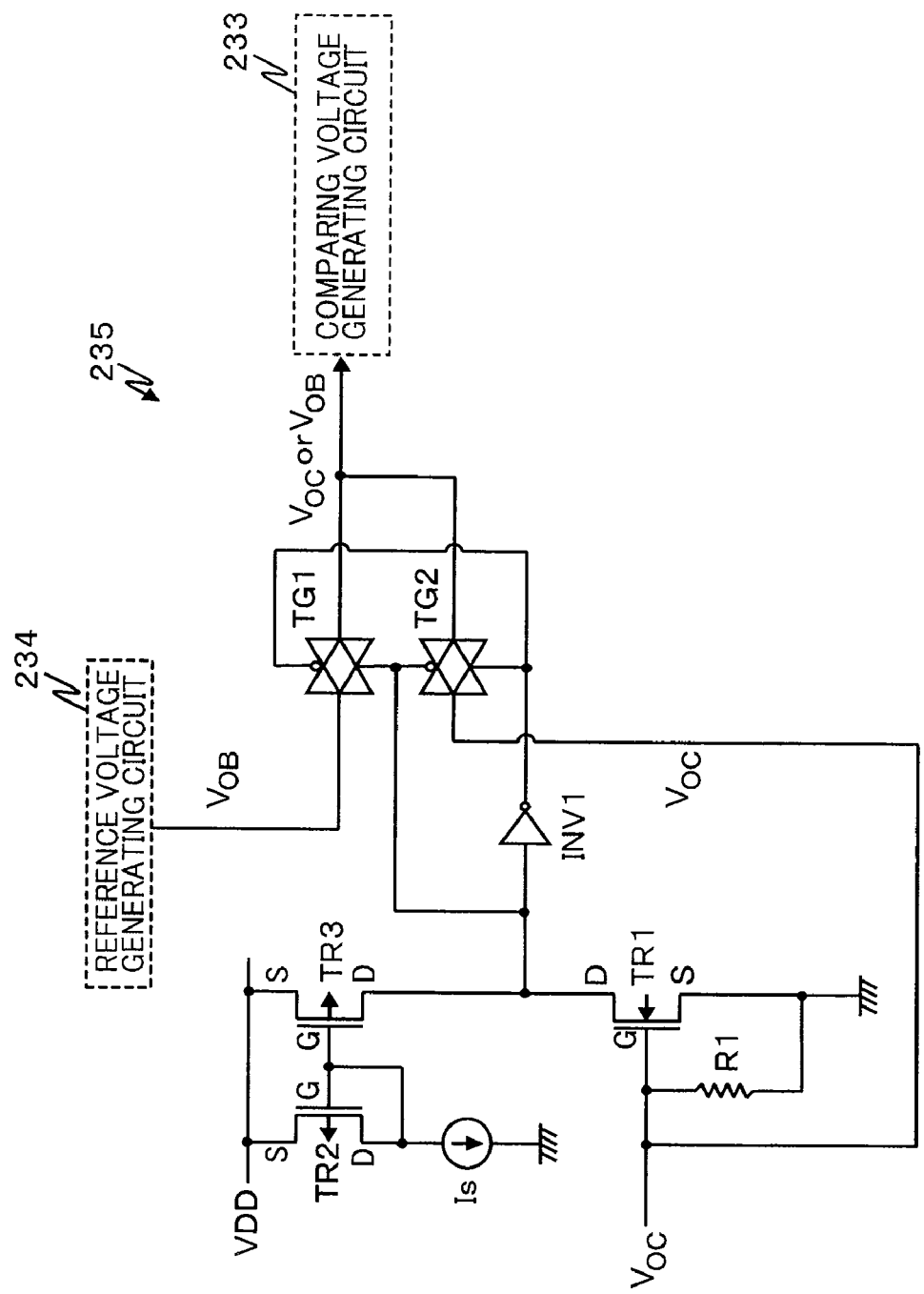
FIG. 2 is a diagram showing an example of a selection circuit 235 as an embodiment of the present invention.

An example of the selection circuit 235 capable of executing the above operations is shown in FIG. 2. In FIG. 2, a gate of a transistor TR1 is connected to the reference voltage input terminal 2315 and is applied with the reference voltage $V_{OC}$ (first reference voltage) from the charger 1. A drain of the transistor TR1 is connected to a drain of a transistor TR3. Transistors TR2 and TR3 make up a current mirror circuit that is connected to a constant current source Is and a power source VDD. A source of the transistor TR1 is grounded. Between the gate and the source of transistor TR1, resistance R1 is connected. A transmission gate TG1 is input with the reference voltage $V_{OB}$ output from the reference voltage generating circuit 234 and a transmission gate TG2 is input with the reference voltage $V_{OC}$.

One control terminal of the transmission gate TG1 is applied with a voltage that is obtained by inverting a voltage of the drain of the transistor TR1 by an inverter INV1. The other control terminal of the transmission gate TG1 is applied with a voltage of the drain of the transistor TR1. One control terminal of the transmission gate TG2 is applied with a voltage of the drain of the transistor TR1. The other control terminal of the transmission gate TG2 is applied with a voltage obtained by inverting a voltage of the drain of the transistor TR1 by the inverter INV1 Outputs from the transmission gates TR1 and TR2 are input to the comparing voltage generating circuit 233. Transistors TR3 and TR1 are selected such that the relation in size therebetween is in TR3>TR1.

It is assumed that the charger 1 is connected to the battery pack 2 and the reference voltage $V_{OC}$ is applied to the reference voltage input terminal 2315. In this case, since the transistor TR1 is turned on and the drain potential thereof approaches the ground potential, the transmission gate TG1 is turned off and the transmission gate TG2 is turned on. As a result, the comparing voltage generating circuit 233 is input with the reference voltage $V_{OC}$ from the charger 1.

On the other hand, when the charger 1 is not connected to the battery pack 2, since the transistor TR1 is turned off and the drain potential thereof approaches VDD, the transmission gate TG1 is turned on and the transmission gate TG2 is turned off. As a result, the comparing voltage generating circuit 233 is input with the reference voltage $V_{OB}$ generated by the reference voltage generating circuit 234 of the battery pack 2.

The comparing voltage generating circuit 233 generates a comparing voltage $V_{HB}$ based on the reference voltage $V_{OC}$ (the first reference voltage) or the reference voltage $V_{OB}$ input from the selection circuit 235. That is, the comparing voltage generating circuit 233 generates the comparing voltage $V_{HB}$: based on the reference voltage $V_{OC}$ when the charger 1 is connected to the battery pack 2; and based on the reference voltage $V_{OB}$ when the charger 1 is not connected to the battery pack 2.

A non-inverting input of the comparator 232 (the second comparator) is applied with the comparing voltage $V_{HB}$, and an inverting input thereof is applied with a battery voltage $V_{BATT}$ of the lithium ion secondary battery 21 input to the positive input terminal 2311. The comparator 232 outputs a voltage corresponding to the relation in magnitude between the comparing voltage $V_{HB}$ and the battery voltage $V_{BATT}$. A comparing output voltage output from the comparator 232 is input to the control circuit 231.

The control circuit 231 controls output voltages of gate voltage output terminals 2313 and 2314 corresponding to a voltage input from the comparator 232 and, thereby turning on or off the MOSFETs 221 and 222. For example, when the battery voltage $V_{BATT}$ and the comparing voltage $V_{HB}$ are in $V_{BATT}>V_{HB}$, the control circuit 231 turns off the MOSFET 221 and turns on the MOSFET 222 and, thereby, the supply of the charging voltage to the lithium ion secondary battery 21 is stopped.

As described above, in the charging system according to an embodiment of the present invention, the comparing voltage $V_{HC}$ on the charger 1 side and the comparing voltage $V_{HB}$ on the battery pack 2 side are generated, based on the common reference voltage $V_{OC}$ while the battery 21 is being charged. Therefore, in the charging system according to an embodiment of the present invention, the comparing voltages $V_{HB}$ and $V_{HC}$ can be set considering only the unevenness (±50 mV) of one reference voltage $V_{OC}$.

Figure 3:
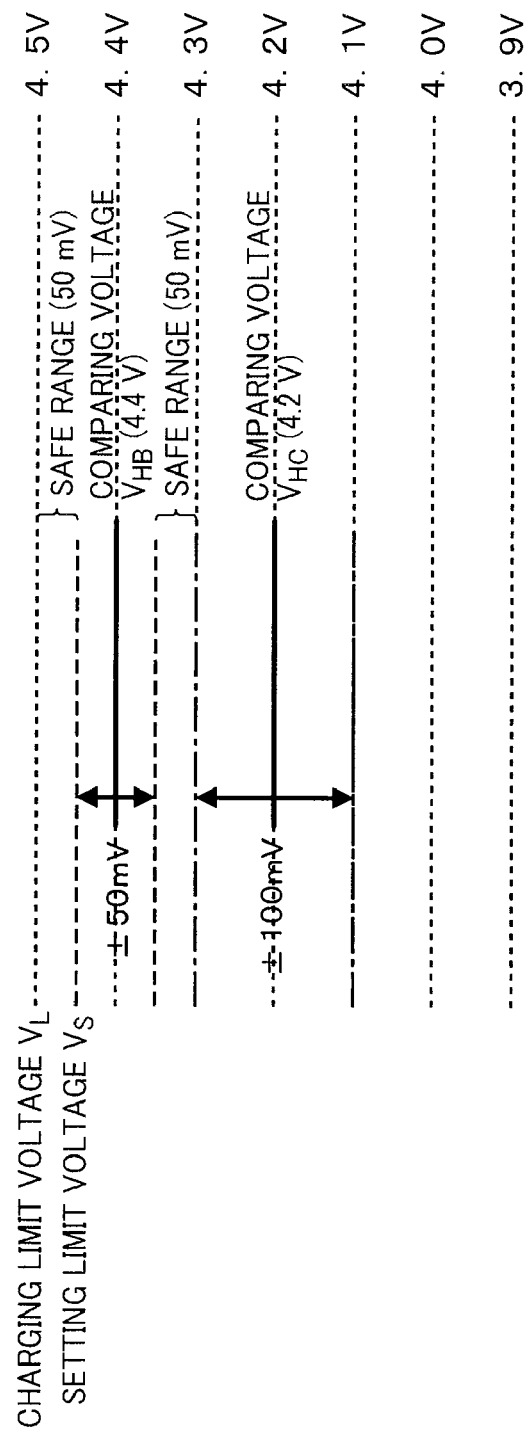
FIG. 3 is a diagram showing a relation among voltages of the lithium ion secondary battery 21 when the battery 21 is charged according to an embodiment of the present invention.
Figure 4:
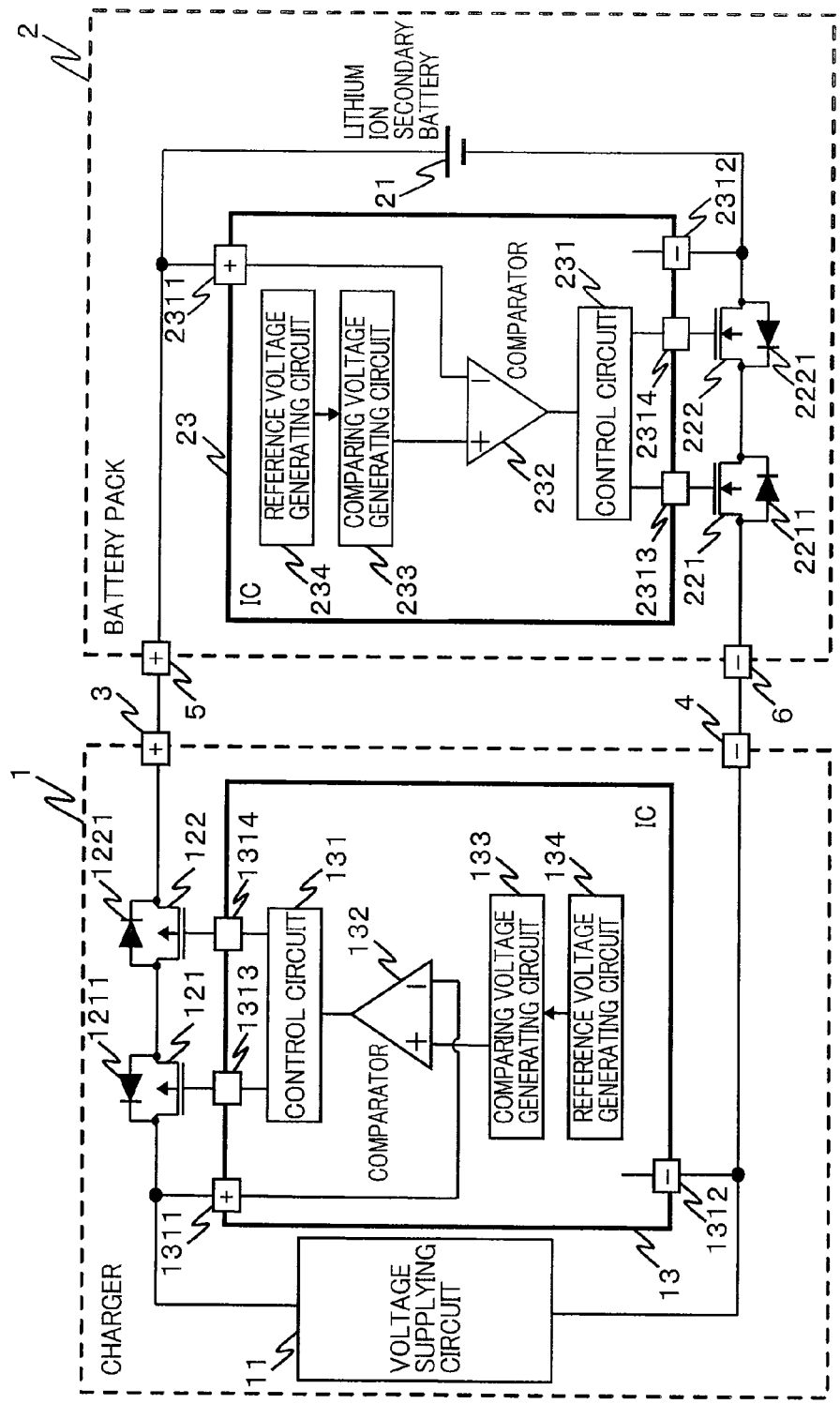
FIG. 4 is a diagram showing an example of a charging system of a lithium ion secondary battery 21.
Figure 5:
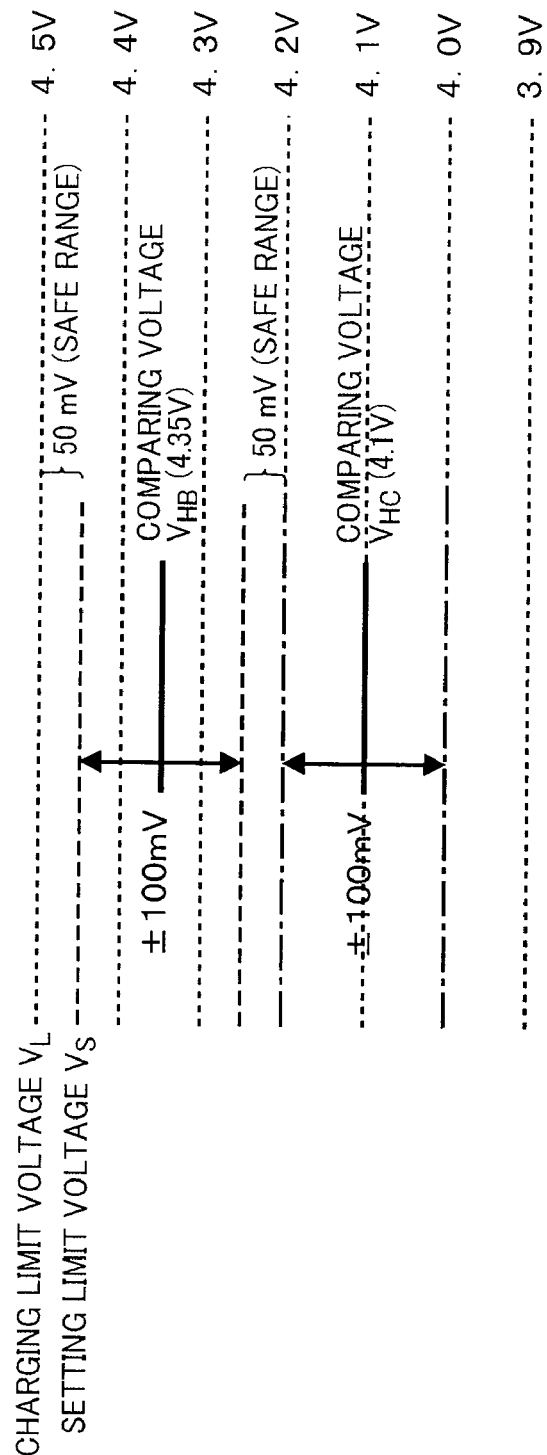
FIG. 5 is a diagram showing a relation among various voltages of the lithium ion secondary battery 21 when the battery 21 is charged.

FIG. 3 is a diagram of an exemplary setting of the comparing voltages $V_{HB}$ and $V_{HC}$. As shown in FIG. 3, the comparing voltages $V_{HB}$ and $V_{HC}$ can be set in value at 4.4 V and 4.2 V respectively, which values are closer to the charging limit voltage $V_L$ compared to those in the case shown in FIG. 5.

As above, according to the charging system of an embodiment of the present invention, the lithium ion secondary battery 21 can be charged at a higher voltage, ensuring fully the security. Thereby, the amount of charge of the lithium ion secondary battery 21 can be increased when the lithium ion secondary battery 21 is charged.

The above embodiments of the present invention are simply for facilitating the understanding of the present invention and are not in any way to be construed as limiting the present invention. The present invention may variously be changed or altered without departing from its spirit and encompass equivalents thereof.

For example, the present invention can be applied to a charging system for a battery other than the lithium ion secondary battery.

What is claimed is:

1. A protection circuit comprising:
   a second circuit to be connected to a first circuit,
   the first circuit including:
   a first reference voltage generating circuit configured to generate a first reference voltage;
   a first comparing voltage generating circuit configured to generate a first comparing voltage to be compared with a battery voltage of a secondary battery to be charged based on the first reference voltage;
   a first comparator configured to output a first comparing output voltage corresponding to relation in magnitude between the first comparing voltage and the battery voltage; and
   a first control circuit configured to control supply of a charging voltage to the secondary battery corresponding to the first comparing output voltage,
   the second circuit including:
   a second comparing voltage generating circuit configured to be input with the first reference voltage and to generate a second comparing voltage to be compared with the battery voltage based on the first reference voltage;
   a second comparator configured to output a second comparing output voltage corresponding to relation in magnitude between the second comparing voltage and the battery voltage; and a second control circuit configured to control the supply of the charging voltage to the secondary battery corresponding to the second comparing output voltage.

2. The protection circuit of claim 1, further comprising:
a second reference voltage generating circuit configured to generate a second reference voltage; and
a selection circuit configured to select either one of the first reference voltage input from the first circuit and the second reference voltage, to be input to the second comparing voltage generating circuit.

3. The protection circuit of claim 1, wherein
the second circuit is integrated, and
the second circuit further includes a terminal to which the first reference voltage is input.

4. The protection circuit of claim 2, wherein
the second circuit is integrated, and
the second circuit further includes a terminal to which the first reference voltage is input.

5. A protection circuit comprising:
a first circuit including:
a first reference voltage generating circuit configured to generate a first reference voltage;
a first comparing voltage generating circuit configured to generate a first comparing voltage to be compared with a battery voltage of a secondary battery to be charged based on the first reference voltage;
a first comparator configured to output a first comparing output voltage corresponding to relation in magnitude between the first comparing voltage and the battery voltage; and
a first control circuit configured to control supply of a charging voltage to the secondary battery corresponding to the first comparing output voltage; and
a circuit configured to output the first reference voltage to an exterior,
the first circuit being to be connected to a second circuit including:
a second comparing voltage generating circuit configured to be input with the first reference voltage and to generate a second comparing voltage to be compared with the battery voltage based on the first reference voltage;
a second comparator configured to output a second comparing output voltage corresponding to relation in magnitude between the second comparing voltage and the battery voltage; and
a second control circuit configured to control the supply of the charging voltage to the secondary battery corresponding to the second comparing output voltage.

6. The protection circuit of claim 5, wherein
the first circuit is integrated, and
the first circuit further includes a terminal from which the first reference voltage is output.

* * * * *